(12) United States Patent
Begyn (10) Patent No.: US 10,040,388 B1
(45) Date of Patent: Aug. 7, 2018

(54) SECUREMENT HOOK

(71) Applicant: Chris Begyn, Taylor Ridge, IL (US)

(72) Inventor: Chris Begyn, Taylor Ridge, IL (US)

(73) Assignee: B&B Machines, Inc., Rock Island, IL (US)

(*) Notice: Subject to any disclaimer, the term of this patent is extended or adjusted under 35 U.S.C. 154(b) by 0 days.

(21) Appl. No.: 15/583,971

(22) Filed: May 1, 2017

Related U.S. Application Data (60) Provisional application No. 62/329,671, filed on Apr. 29, 2016.

(51) Int. Cl.
| | |
|---|---|
| *B60P 7/06* | (2006.01) |
| *B60P 7/08* | (2006.01) |
| *F41C 3/00* | (2006.01) |
| *F16B 45/00* | (2006.01) |
| *B66C 1/18* | (2006.01) |

(52) U.S. Cl.
CPC ............ *B60P 7/0807* (2013.01); *F16B 45/00* (2013.01); *B66C 1/18* (2013.01)

(58) Field of Classification Search
CPC .......... B66C 1/18; B60P 7/0807; F16B 45/00; F41C 33/001
USPC .......... 248/599, 300, 301; 24/129 R, 134 R, 24/198, 199, 716, 698.1; 294/74, 82.1
See application file for complete search history.

(56) References Cited

U.S. PATENT DOCUMENTS

| | | | | | |
|---|---|---|---|---|---|
| 1,718,291 | A | * | 6/1929 | Guenther | A44B 11/04 24/199 |
| 3,343,862 | A | * | 9/1967 | Holmes | B66C 1/18 24/134 R |
| 4,542,840 | A | * | 9/1985 | Pepper, Sr. | F41C 33/001 224/150 |
| 5,651,573 | A | * | 7/1997 | Germain | B66C 1/18 24/129 R |
| 5,836,060 | A | * | 11/1998 | Profit | B60P 7/0807 24/198 |
| 7,841,496 | B1 | * | 11/2010 | Schweikert | F41C 33/002 224/150 |

* cited by examiner

*Primary Examiner* — Tan Le
(74) *Attorney, Agent, or Firm* — Hamilton IP Law, PC; Jay R. Hamilton; Charles Damschen (57) ABSTRACT

A securement hook is disclosed herein having five sides and allowing for multiple interior voids therein insertion and connection with hooks or loops, and combinations therein, for use in securement of a load during transit or any other use requiring a high strength compact securement device attachable to cables, ropes or straps.

16 Claims, 11 Drawing Sheets

SECUREMENT HOOK

CROSS REFERENCE TO RELATED APPLICATIONS

Applicant states that this application claims the filing benefit of provisional U.S. Pat. App. No. 62/329,671 filed on Apr. 29, 2016, and said application is incorporated by reference herein in its entirety.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

BACKGROUND OF THE INVENTION

Field of the Invention

According to AAA's Foundation for Traffic Safety, poorly secured loads are responsible for more than 25,000 crashes and approximately 90 fatalities in the USA each year. The person or entity tasked with carrying a load is liable for any damage or destruction is resulting from the failure to properly secure a load.[1]

[1]. http://www.familyhandyman.com/automotive/pickup-trucks-how-to-transport-things/view-all

SUMMARY OF DISCLOSURE

As disclosed, the Securement Hook is configured to engage the end of a loading strap which may be used to attach to, engage with or surround a load to improve the convenience and safety of hauling the load to be secured.

BRIEF DESCRIPTION OF THE DRAWINGS

The accompanying drawings, which are incorporated in and constitute a part of this specification, illustrate embodiments and together with the description, serve to explain and illustrate the principles of the Securement Hook (hereinafter referred to simply as the "Securement Hook") as disclosed herein.

Appendix A is included herein and provides additional inventor disclosure and description for implementation including dimensions, as provided by the inventor for inclusion herein, and may be claimed in whole or in part, for its use in the implementation of the present disclosure, and is fully incorporated by reference herein.

| DETAILED DESCRIPTION - TABLE OF ELEMENTS | |
|---|---|
| Element Description | Element Number |
| Vertice | A, B, C, D, E |
| Lateral portion (first) | 1 |
| First end | 2 |
| First side | 3 |
| Second side | 4 |
| Void - first | 5a |
| Void - second | 5b |
| Inner lateral | 6 |
| $4^{th}$ side | 7 |
| Straight section | 7a |
| Jaw | 7b |
| $5^{th}$ side | 8 |
| Straight section | 8a |
| Sweeping curve | 8b |
| Hook eye | 8c |
| Hook eye opening | 8d |
| Second end | 9 |
| Securement Hook | 10 |
| Strap | 11 |
| J-hook | 12 |
| Flat hook | 13 |
| Ratchet | 14 |
| D-ring | 15 |

DETAILED DESCRIPTION

Before the present Securement Hook is disclosed and described, it is to be understood that the Securement Hook is not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used with at least one embodiment of the disclosed Securement Hook 10. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all potential embodiments of the Securement Hook 10. This applies to all aspects of this application including, but not limited to, components of a Securement Hook 10. Thus, if there are a variety of additional components that can be added it is understood that each of these additional components can be added with any specific embodiment or combination of embodiments of the Securement Hook 10. The present Securement Hook 10 may be understood more readily by reference to the following detailed description of preferred embodiments and the examples included therein and to the Figures and their previous and following description.

Figure 1:
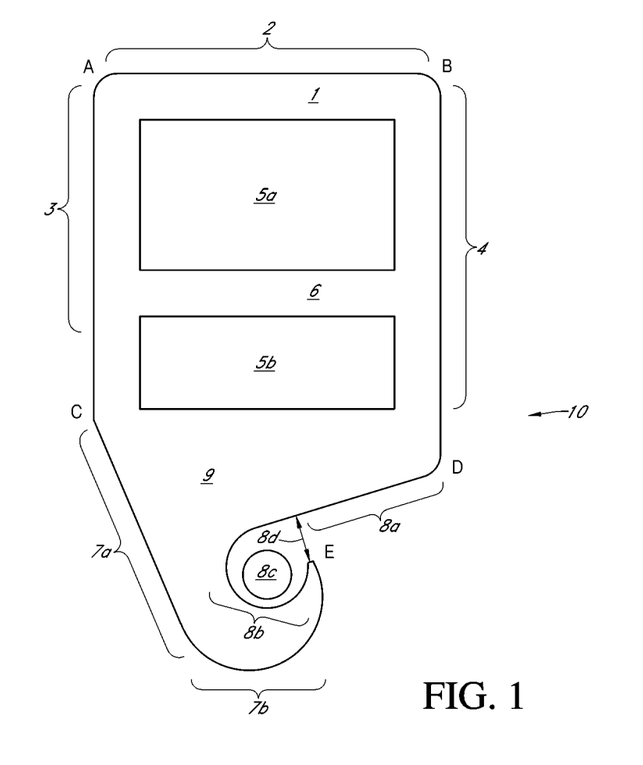
FIG. 1 is top view of the Securement Hook disclosed herein along with detailed call-outs for enablement of the present disclosure.
Figure 2:
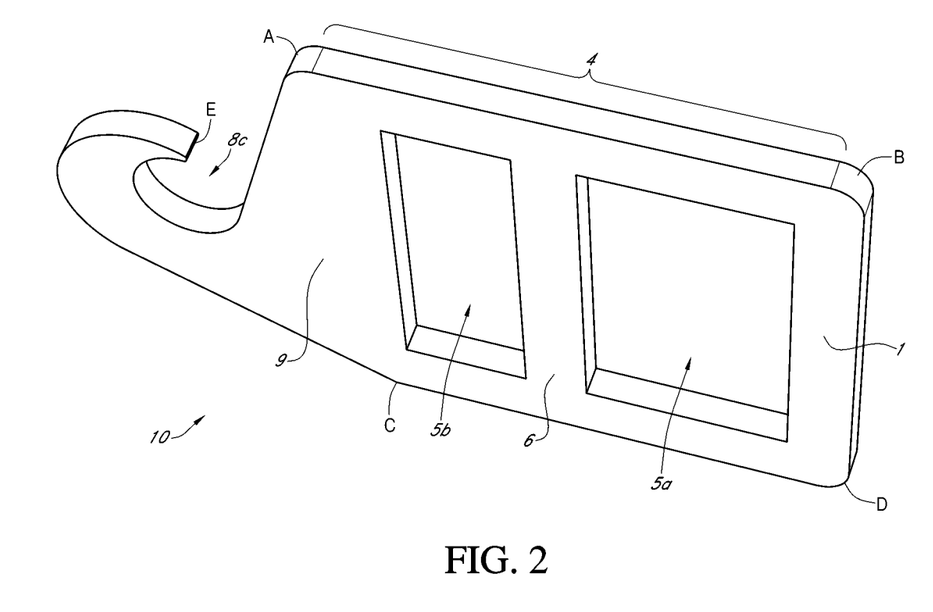
FIG. 2 is a side view of the Securement Hook disclosed at FIG. 1.
Figure 3:
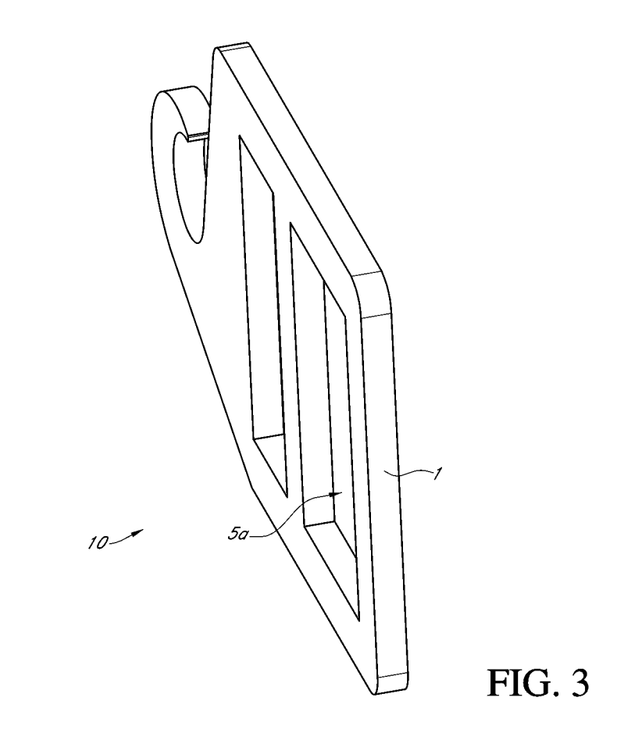
FIG. 3 is an end view of the Securement Hook as disclosed at FIG. 1.
Figure 4:
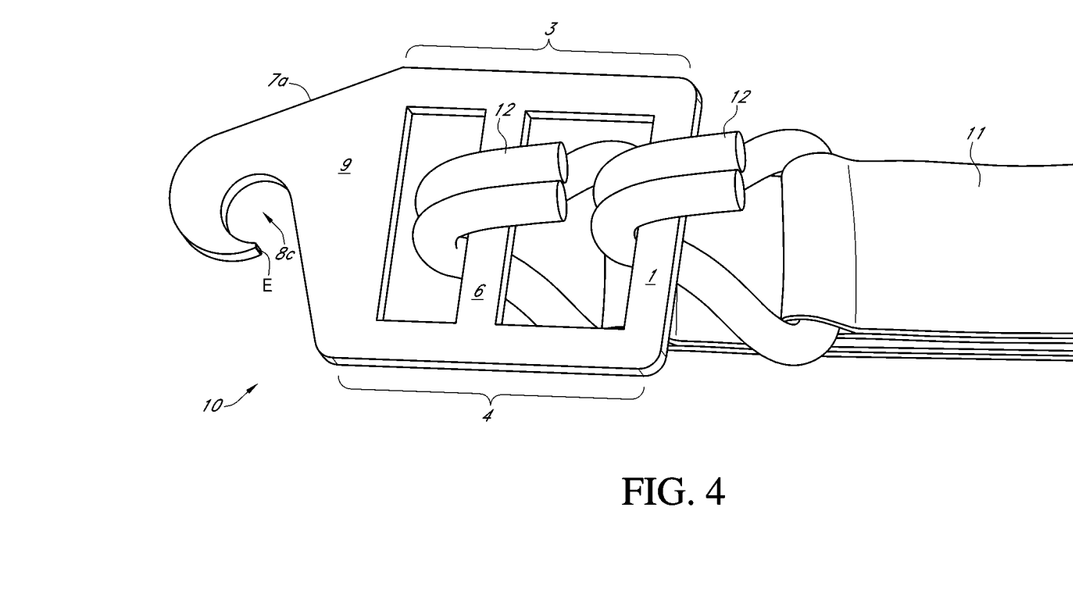
FIG. 4 is a detailed perspective view of the Securement Hook as disclosed at FIG. 1 engaged with a pair of J-hooks affixed to the end of a load strap as found in the prior art for improved securement of a load.

FIG. 1 is a top view of the securement hook (10) subject of the present disclosure. As shown, the shape of the securement hook (10) is generally defined by five (5) vertices called out as A, B, C, D and E in FIG. 1 to form the outer perimeter of the securement hook (10). In geometry, a vertex (plural: vertices or vertexes) is a point where two or more curves, lines, or edges meet. As a consequence of this definition, the point where two lines meet to form an angle and the corners of polygons and polyhedra are vertices. As shown, side AB forms a first lateral (1) portion and defines a first end (2) portion of the securement hook (10). In the embodiment shown, without restriction or limitation and for purposes of enablement only, side AB (2) is 3.75 inches. The interior of first lateral portion (1) is configured for engagement with the end of a tie down or ratchet strap (see FIGS. 4-8) having various ends including without limitation a double "J" hook as shown at FIG. 4. Sides AC/BD form a first side (3) and a second side (4), respectively, and define the sides of the securement hook (10). In the embodiment shown, without restriction or limitation and for purposes of enablement only, side AC (3) is 3.75 inches. In the embodiment shown, without restriction or limitation and for purposes of enablement, side BD (4) is 4.3 inches. A pair of inner voids (5a, 5b) are formed by inner lateral (6) connecting side AC (3) to BD (4). In the embodiment shown, without restriction or limitation and for purposes of enablement only, inner void 5a is approximately 2.5 inches wide. In the embodiment shown, without restriction or limitation and for purposes of enablement only, inner void 5b is approximately 1.5 inches wide. As shown, the inner voids (5a, 5b) are unequal in size due to the vertical position of inner lateral (6) in relation to the sides (3, 4). One of ordinary skill will appreciate other sizes for the inner voids (5a, 5b) may be selected by changing the position of inner lateral 6 in relation to the sides (3, 4). One benefit of having either first inner void (5a) or second inner void (5b) be of greater area than the other is to enable a user to use various strap ends having a larger profile or smaller profile and or "double hooking" around the securement hook (10) to facilitate securing a particular load or using a particular tie down strategy or method. (See FIGS. 4-8) One of ordinary skill will appreciate the inner voids (5a, 5b) may be equally sized without departure from the spirit and scope of the present disclosure. Further, one of ordinary skill will appreciate that the securement hook (10) could be formed without an inner lateral (6) without departure from the present disclosure. (Not shown)

Further as shown in FIG. 1, sides CE (7) and DE (8) form a second end portion (9) of the securement hook (10) with side CE (7) forming the outer portion of the $4^{th}$ side of the securement hook 10 and side DE (8) forming the outer portion of the $5^{th}$ side, each called out, respectively, as (7) and (8). In the embodiment shown, without restriction or limitation and for purposes of enablement, side CE (7) is approximately 4.5 inches. In the embodiment shown, without restriction or limitation and for purposes of enablement, side DE (8) is approximately 3.75 inches. Together, sides (7) and (8) form the $2^{nd}$ end of the securement hook (10). As shown in FIG. 1, side CE is generally made up of straight section (7a) which then curves up to end at vertice E, resembling the lower portion of a jaw (7b) of the securement hook (10). As shown in FIG. 1, side DE (8) is also made up of a combination of straight and curved portions which has a generally linear (straight) profile moving from vertice D to the opening between Vertice E and side DE (8) which is generally called out as (8a) in FIG. 1. Side DE then makes a sweeping curve back around before jutting up at Vertice E. This section is generally called out as (8b). The sweeping curve (8b) forms an area that is generally exterior the sides of the securement hook (10) while being generally surrounded. Applicant defines the circular area interior of Vertice E as the hook eye (8c). In use, the generally straight portion of side DE between vertice D and Vertice E induces improved engagement with a D-ring (15) or other holding structure to be inserted into the hook eye (8c) by allowing for contact with and sliding along side (8a) and for delivery into and through the hook eye opening (8d) into hook eye (8c). In the embodiment shown throughout, without restriction or limitation and for purposes of enablement only, the hook eye opening is approximately 0.60 inches in diameter. The generally non-symmetrical shape of the securement hook (10), particularly at sides CE and DE, provides for an offset appearance to the securement hook (10), although the hook eye is generally positioned in the center of the securement hook (10). As shown, the hook eye 8c and hook eye opening (8d) are sized to allow most D-rings to be used with the securement hook 10 while minimizing the overall profile of the securement hook 10. D-rings 15 typically have a diameter in the range of 0.25-0.55 inches. As shown, without limitation or restriction, the securement hook (10) is suitable for D-rings (15) having a diameter up to 0.55 inches.

It is contemplated that in the illustrative embodiment shown in the enclosed figures the Securement Hook 10 may be constructed of, but not limited to, any metal or combination of metals including bronze, steel and aluminum; plastics or carbon fiber including Kevlar®, foam-blown polyurethane, thermoplastic polyurethane, ethylene vinyl acetate, other polymers, other thermoplastics, carbon rubber, blown rubber polymers, composite materials, natural materials (e.g., rubber, leather, etc.), elastomers, combinations thereof, and/or any other material with suitable characteristics (e.g., compressive strength, stability, elasticity, density). This particular embodiment of a securement hook (10) was fabricated from non-heat tempered steel (material grade 50) using laser cutting technology, which is well known to those of ordinary skill in the art. One of ordinary skill will appreciate that the securement hook (10) could constructed by any method known to those in the art including via casting, forging and machining or stamping and punching, without restriction or limitation. As supported by outside party testing, the securement hook (10) shown in FIGS. 1-8 has an almost 3200 lb. breaking point. (See Appendix A submitted herein)

Figure 5:
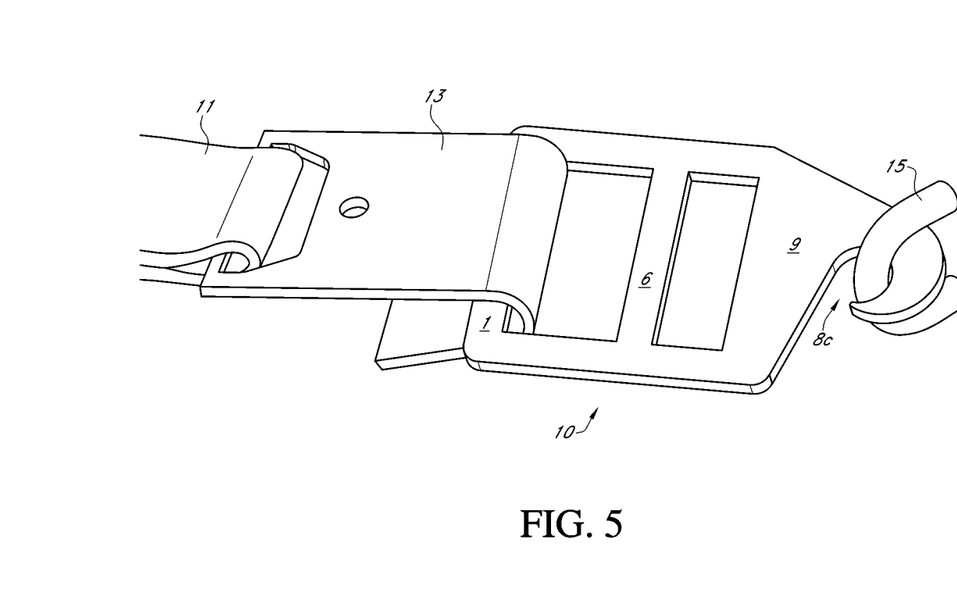
FIG. 5 is a detailed perspective view of the Securement Hook as disclosed at FIG. 1 engaged with the flat hook of a load strap as found in the prior art for improved securement of a load.

FIG. 4 provides a detailed perspective view of the Securement Hook (10) as disclosed throughout engaged with a pair of J-hooks (12) affixed to the end of a load strap (11) as found in the prior art for improved securement of a load (not shown). FIG. 5 is a detailed perspective view of the Securement Hook (10) as disclosed at FIG. 1 engaged with the flat hook (13) of a load strap (11) as found in the prior art for improved securement of a load. (not shown)

Figure 5A:
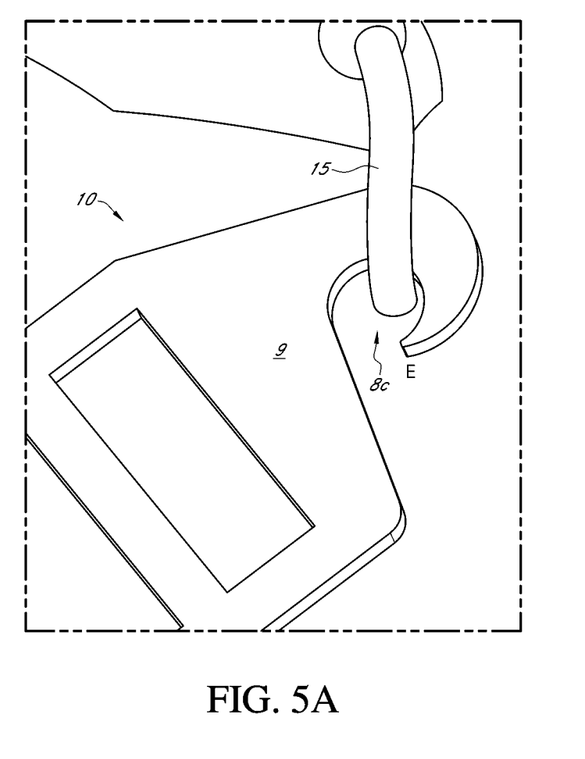
FIG. 5A is a detailed perspective view of the Securement Hook as shown in FIG. 5 with particular focus on the second end of the securement hook engaged with a D-ring as found in the prior art for improved securement of a load.
Figure 5B:
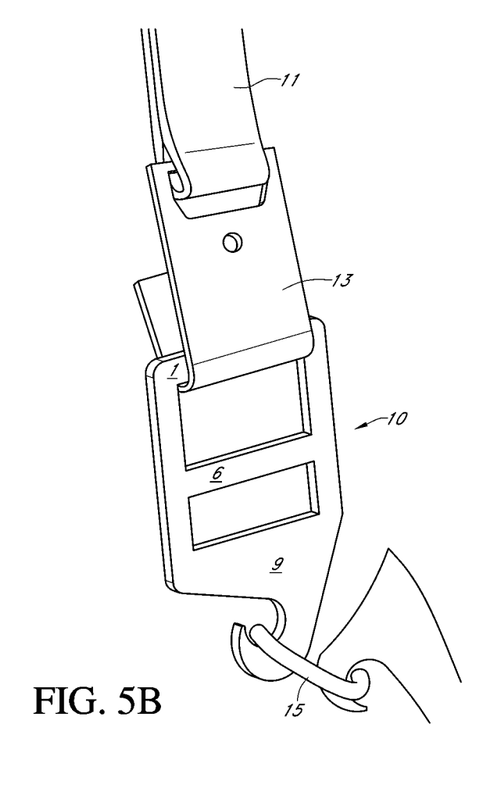
FIG. 5B is another perspective view of the Securement Hook as shown in FIG. 5 illustrating the flat hook engaged with the first side of the Securement Hook which is shown attached to a D-ring as found in the prior art for improved securement of a load.

FIG. 5A is a detailed perspective view of the securement hook (10) as shown in FIG. 5 with particular focus on the second end (9) of the securement hook (10) engaged with a D-ring (15) as found in the prior art for improved securement of a load. FIG. 5B is another perspective view of the securement hook (10) as shown in FIG. 5 illustrating the flat hook (13) engaged with the first side (1) of the securement hook (10) which is shown attached to a D-ring (15) as found in the prior art for improved securement of a load.

One of ordinary skill will appreciate that the securement hook (10) disclosed herein is designed, fabricated and configured to work with either or both flat hooks (13) and J-hooks (12) as shown but is in no way limited to working only with those particular types of strap ends attachment.

Figure 6:
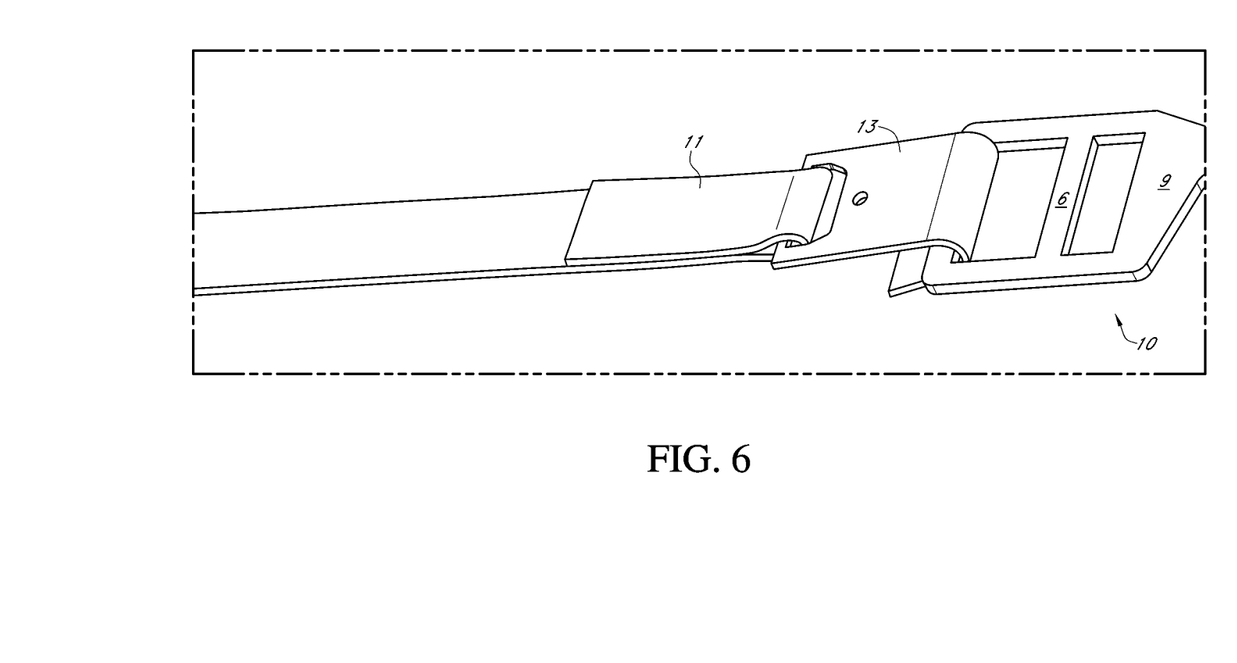
FIG. 6 is another perspective view of the Securement Hook as disclosed illustrating the flat hook having a strap connected therein and engaged with the first side of the Securement Hook which is shown attached to a D-ring as found in the prior art for improved securement of a load.

FIG. 6 is another perspective view of the securement hook (10) as disclosed illustrating the flat hook (13) having a strap (11) connected therein and engaged with the first side (1) of the securement hook (10) which is shown attached to a D-ring (15) as found in the prior art for improved securement of a load.

Figure 7A:
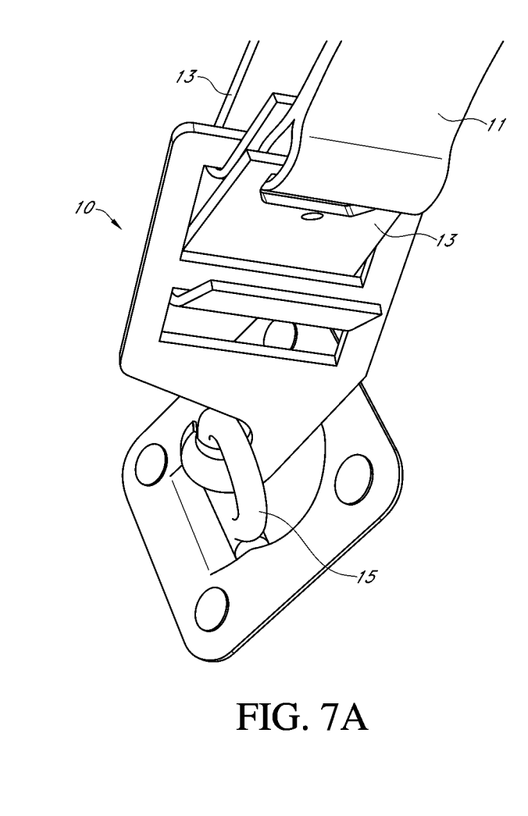
FIG. 7A is a first side view of the Securement Hook as shown throughout engaged between a D-ring and a pair of flat hooks having straps attached therein as found in the prior art for improved securement of a load.
Figure 7B:
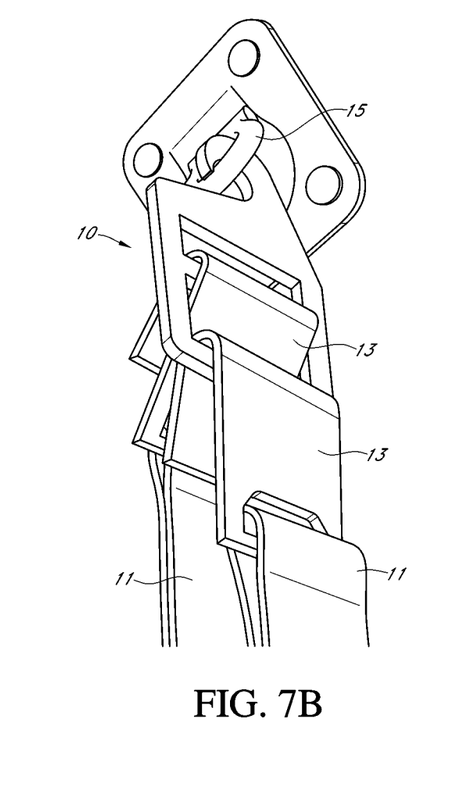
FIG. 7B is a second side view of the Securement Hook as shown throughout engaged between a D-ring and a pair of flat hooks having straps attached therein as found in the prior art for improved securement of a load.

FIG. 7A is a first side view of the securement hook (10) as shown throughout engaged between a D-ring (15) and a pair of flat hooks (13) having straps (11) attached therein as found in the prior art for improved securement of a load. FIG. 7B is a second side view of the securement hook (10) as shown throughout engaged between a D-ring (15) and a pair of flat hooks (13) having straps (11) attached therein as found in the prior art for improved securement of a load.

Figure 8:
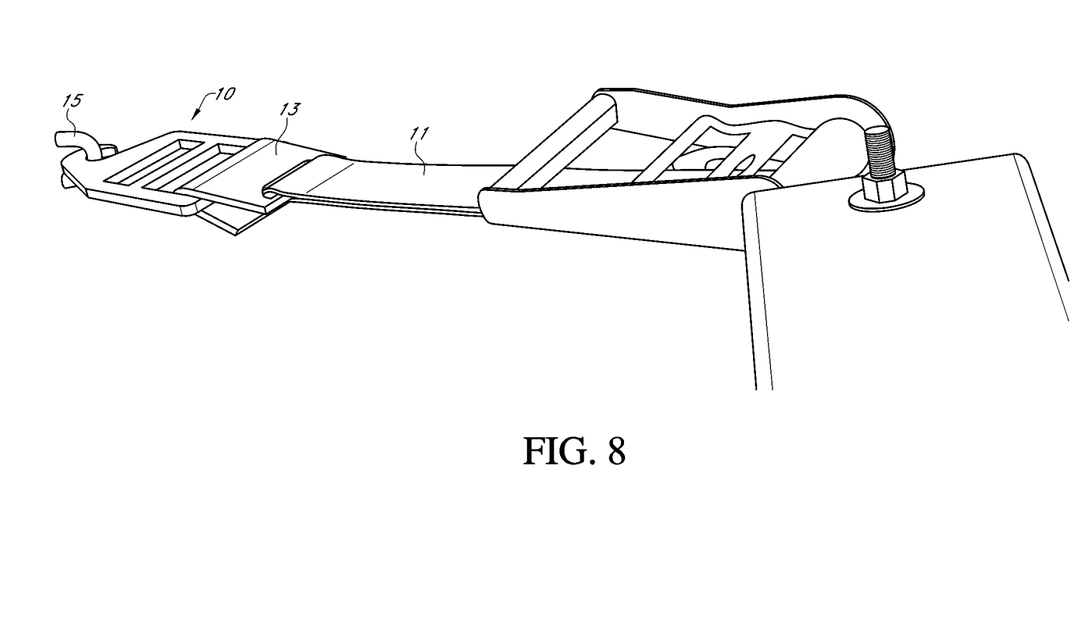
FIG. 8 is perspective view of the Securement Hook as shown throughout engaged between a D-ring and a flat hook having straps attached therein engaged with a ratchet system as found in the prior art for improved securement of a load.

FIG. 8 is perspective view of the securement hook (10) as shown throughout engaged between a D-ring (15) and a flat hook (13) having straps (11) attached therein engaged with a ratchet system (14) as found in the prior art for improved securement of a load. One of ordinary skill will appreciate that another beneficial feature of the securement hook (10) disclosed is its versatility and compatibility with prior art straps, rings and other means of securing loads.

Having described the preferred embodiments, other features of the Securement Hook will undoubtedly occur to those versed in the art, as will numerous modifications and alterations in the embodiments as illustrated herein, all of which may be achieved without departing from the spirit and scope of the Securement Hook disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the use and access of Securement Hooks and aesthetic controllable natural lighting systems. Furthermore, the methods and embodiments pictured and described herein are no way limiting to the scope of the Securement Hook and method of use unless so stated in the following claims.

It should be noted that the Securement Hook is not limited to the specific embodiments pictured and described herein, but is intended to apply to all similar apparatuses and methods for providing the various benefits and/or features of a Securement Hook. Modifications and alterations from the described embodiments will occur to those skilled in the art without departure from the spirit and scope of the Securement Hook. It is understood that the Securement Hook as disclosed herein extends to all alternative combinations of one or more of the individual features mentioned, evident from the text and/or drawings, and/or inherently disclosed. All of these different combinations constitute various alternative aspects of the Securement Hook and/or components thereof. The embodiments described herein explain the best modes known for practicing the Securement Hook and/or components thereof and will enable others skilled in the art to utilize the same. The claims are to be construed to include alternative embodiments to the extent permitted by the prior art.

While the Securement Hook has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: Maters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

What is claimed is:
1. A securement hook for load securement comprising:
   a) a body having a front side and a back side, the body further defined by a first vertice (A) and a second vertice (B), the first vertice (A) and the second vertice (B) connected and defined by a first lateral (1) to define a first end (2) of the body, b) a third vertice (C), wherein the third vertice (C) and the first vertice (A) are connected by a first side (3);

c) a fourth vertice (D), wherein the fourth vertice (D) and the second vertice (B) are connected by a second side (4);

d) a second lateral (6), the second lateral (6) connected to and between the first side (3) and the second side (4), a first void (5a) formed between the first lateral (1) and the second lateral (6) wherein a second void (5b) is positioned interior of and adjacent the second lateral (6), wherein said first lateral (1) and second lateral (6) are suitable for attachment; and, e) a fifth vertice (E), the fifth vertice (E) formed at the junction of a fourth side and a fifth side, the fourth side connecting the third vertice (C) to the fifth vertice (E) and the fifth side connecting the fourth vertice (D) to the fifth vertice (E), wherein the fourth side (7) is further comprised of a straight section (7a) adjacent the third vertice (C) transitioning to a jaw section (7b) having a curved shape adjacent the fifth vertice (E), wherein the jaw section (7b) is curved towards the fifth side (8) to form and partially enclose the hook eye (8c), wherein the fifth side has a straight portion proximate the fourth vertice (D) that transitions via a sweeping curve proximate the fifth vertice (E) to form a hook eye (8c) interior the fifth vertice (E) suitable for attachment.

2. The securement hook for load securement according to claim 1 wherein a hook eye opening (8d) is positioned between the fifth vertice (E) and the fifth side 8.

3. The securement hook for load securement according to claim 1 wherein the fifth vertice (E) is positioned below both the third vertice (C) and the fourth vertice (D).

4. The securement hook for load securement according to claim 1 wherein the first side (3) and the second side (4) are opposite each other and generally parallel.

5. The securement hook for load securement according to claim 1 wherein the body is generally flat.

6. The securement hook for load securement according to claim 1 wherein the second lateral (6) is positioned between the first side and the second side so as to make the area of the first void (5a) equal to the area of the second void (5b).

7. The securement hook for load securement according to claim 1 wherein the second side (4) is greater in length than the first side (3).

8. The securement hook for load securement according to claim 1 wherein the second lateral (6) is positioned between the first side and the second side so as to make the area of the first void (5a) greater than the area of the second void (5b).

9. The securement hook for load securement according to claim 1 wherein the securement hooks can be constructed so that a plurality of the securement hooks may be positioned face to back for stacked storage.

10. The securement hook for load securement according to claim 1 wherein the securement hook can be constructed so that a plurality of the securement hooks may be positioned face to back for use to increase the amount of load that may be secured.

11. The securement hook for load securement according to claim 1 wherein the securement hook can be constructed from metal.

12. The securement hook for load securement according to claim 1 wherein the securement hook can be constructed from metal using a laser cutter.

13. A securement hook for load securement comprising:

a) a generally flat body having a front side and a back side, the body further defined by a first vertice (A) and a second vertice (B), the first vertice (A) and the second vertice (B) connected and defined by a first lateral (1) to define a first end (2) of the body;

b) a third vertice (C), wherein the third vertice (C) and the first vertice (A) are connected by a first side (3);

c) a fourth vertice (D), wherein the fourth vertice (D) and the second vertice (B) are connected by a second side (4);

d) a second lateral (6), the second lateral (6) connected to and between the first side (3) and the second side (4), a first void (5a) formed between the first lateral (1) and the second lateral (6) wherein a second void (5b) is positioned interior of and adjacent the second lateral (6), wherein said first lateral (1) and second lateral (6) are suitable for attachment to a j-hook; and, e) a fifth vertice (E), the fifth vertice (E) formed at the junction of a fourth side and a fifth side, the fourth side connecting the third vertice (C) to the fifth vertice (E) and the fifth side connecting the fourth vertice (D) to the fifth vertice (E), wherein the fourth side (7) is further comprised of a straight section (7a) adjacent the third vertice (C) transitioning to a jaw section (7b) having a curved shape adjacent the fifth vertice (E), wherein the fifth side has a straight portion (8a) proximate the fourth vertice (D) that transitions via a sweeping curve portion (8b) proximate the fifth vertice (E) to form a hook eye (8c) interior the fifth vertice (E), wherein the fourth side (7) is curved towards the fifth side (8) to partially enclose the hook eye (8c), wherein the hook eye (8c) is suitable for attachment to a D-ring, wherein a hook eye opening (8d) is formed between the fifth vertice (E) and the straight section of the fifth side (8a).

14. The securement hook for load securement according to claim 13 wherein the fifth vertice (E) is positioned below both the third vertice (C) and the fourth vertice (D).

15. The securement hook for load securement according to claim 13 wherein the first side (3) and the second side (4) are opposite each other and generally parallel.

16. The securement hook for load securement according to claim 13 wherein the securement hook can be constructed from laser cut metal.

\* \* \* \* \*